United States Patent Office 3,019,233
Patented Jan. 30, 1962

3,019,233
5-HYDROXY-2-OXYPHENYLCYCLOPENTANE-
ALKANOLS AND INTERMEDIATES
Leland J. Chinn, Skokie, Ill., assignor to G. D. Searle &
Co., Chicago, Ill., a corporation of Delaware
No Drawing. Filed Feb. 8, 1960, Ser. No. 7,136
12 Claims. (Cl. 260—343.3)

This invention relates to 5-hydroxy-2-phenylcyclopentanealkanols, intermediates thereto, and processes whereby these alkanols and intermediates can be manufactured. More particularly, this invention relates to chemical compounds of the formula

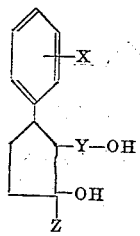

wherein X represents hydrogen or an alkyl, hydroxy, or alkoxy radical; Y represents an alkylene radical; and Z represents hydrogen or an alkyl, alkenyl, or alkynyl radical.

Among the alkyl radicals represented by X in the foregoing formula, especially lower alkyl groupings are preferred, which is to say methyl, ethyl, propyl, isopropyl, butyl, isobutyl, sec-butyl, tert-butyl, pentyl, tert-pentyl, neopentyl, hexyl, isohexyl, heptyl, octyl, and like $C_nH_{2n+1}$ groupings wherein $n$ is a positive integer amounting to less than 9. By the same token, when X represents an alkoxy radical, it too is preferably of lower order, which is to say, of the formula

—O-lower alkyl

The alkylene radicals represented by Y in the generic formula for products of this invention consist of bivalent saturated acyclic straight- or branched-chain hydrocarbon groupings of empirical formula

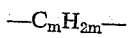
—$C_mH_{2m}$— wherein $m$ is a positive integer greater than 1 and optimally but not exclusively less than 5. Illustrative of such groupings are 1,2-ethylene, trimethylene, 1,2-propylene, tetramethylene, 2-methyl-1,2-propylene, 2,4-pentylene, hexamethylene etc.

The alkyl radicals represented by Z in the generic formula—like those represented by X—are preferably of lower order, whereas the alkenyl and alkynyl radicals which Z alternatively represents are most desirably vinyl and ethynyl groupings, respectively, although other alkenyl and alkynyl radicals, to wit, those of the formulas

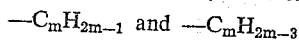
—$C_mH_{2m-1}$ and —$C_mH_{2m-3}$ ($m$ being defined as above) will serve.

The alkanols to which this invention relates are useful because of their valuable pharmacological properties. For example, they are potent diuretics, being adapted to block the effect of desoxycorticosterone acetate on urinary sodium and potassium. They are also, unexpectedly, anti-fungal agents, being characterized by a substantial capacity to inhibit the growth of Trichophyton mentagrophytes. Finally, they manifest anti-cholesterologenic activity. It follows that the intermediates whence the foregoing alkanols are derived have substantial utility by reason of this fact.

Manufacture of the claimed alkanols and intermediates proceeds as detailed in the appended eight working examples which, of course, are offered by way of illustration and not to delimit the invention either in spirit or in scope, since it will be apparent to those skilled in the art of organic synthesis that many modifications, both of materials and of methods, may be practiced without departing from the purpose and intent of this disclosure.

Thus, for instance, substitution of other 2-(p-alkoxyphenyl)-5-oxocyclopentanealkanoic acids for the 2-(p-methoxyphenyl)-5-oxocyclopentaneacetic acid used as a starting material in Example 1A affords other 5-hydroxy-2-(p-hydroxyphenyl)cyclopentanealkanols than the cyclopentaneethanol of Example 1C; and where the alkoxy radical in the starting material is ortho or meta rather than para, the apposite hydroxy radical in the product obtained therefrom according to Example 1 will be correspondingly positioned. The same principles apply to the teachings of the remaining examples.

Throughout the experimental detail hereinafter set forth, temperatures are given in degrees centigrade, pressures in millimeters of mercury, and relative amounts of materials in parts by weight, except as otherwise noted.

Example 1

(A) 2 - (p-hydroxyphenyl)-5 - oxocyclopentaneacetic acid.— To 60 parts of hydriodic acid (sp.g. 1.7) in 10 parts of aceic anhydride is added 5 parts of 2-(p-methoxyphenyl)-5-oxocyclopentaneacetic acid (M.P. 110–112.5°). The resultant mixture is heated at the boiling point under reflux for 5 minutes, then chilled and poured into 200 parts of water. The resultant solution is extracted with ethyl acetate, and the acetate extract in turn is extracted with aqueous 10% potassium bicarbonate. The bicarbonate extract is acidified, and the mixture thus obtained is extracted with ethyl acetate. From this acetate extract, upon drying over anhydrous sodium sulfate and removal of solvent by vacuum distillation, there is obtained 2 - (p-hydroxyphenyl)-5-oxocyclopentaneacetic acid as the residue. The product is an oil resistant to crystallization.

(B) 5-hydroxy-2-(p-hydroxyphenyl)cyclopentaneacetic acid.—To a solution of 36 parts of 2-(p-hydroxyphenyl)-5-oxocyclopentaneacetic acid in 500 parts of aqueous 5% sodium hydroxide is added a solution of 35 parts of sodium borohydride in 250 parts of water. The resultant mixture is let stand for 18 hours at room temperatures, whereupon excess sodium borohydride is destroyed by acidifying with acetic acid, following which alkalinity is reestablished with aqueous sodium hydroxide. The solution thus obtained is washed with ether and then acidified with hydrochloric acid. The mixture which results is extracted with ethyl acetate, and the acetate extract in turn is extracted with aqueous 10% potassium bicarbonate. The bicarbonate extract is acidified and the mixture so produced is extracted with ethyl acetate. This acetate extract is stripped of solvent by vacuum distillation, affording as the residue 5-hydroxy-2-(p-hydroxyphenyl)cyclopentaneacetic acid which, recrystallized from a mixture of hexane and anhydrous ether, melts at 160–164°.

(C) 5 - hydroxy - 2 - (p-hydroxyphenyl)cyclopentaneethanol.—To a solution of 6 parts of lithium aluminum hydride in 180 parts of tetrahydrofuran and 70 parts of anhydrous ether is added, with agitation, 3 parts of 5-hydroxy-2-(p-hydroxyphenyl)cyclopentaneacetic acid in 90 parts of tetrahydrofuran. Agitation is continued while the reactants are heated at the boiling point under reflux for 2 hours, whereupon 8 parts of water, 6 parts of aqueous 20% sodium hydroxide, and 28 parts of water are consecutively introduced. Precipitation occurs in process. The precipitate is removed by filtration, and the filtrate is freed of solvent by distillation. The residual brown oil is 5-hydroxy-2-(p-hydroxyphenyl)cyclopentaneethanol which, crystallized from water, melts at 123–125°. It has the formula

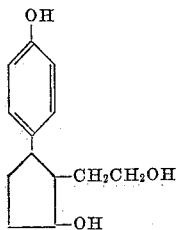

*Example 2*

(A) *Methyl 5-hydroxy-2-(p-methoxyphenyl)-cyclopentaneacetate.*—To a chilled solution of 13 parts of 5-hydroxy - 2 - (p - methoxyphenyl)cyclopentaneacetic acid (M.P. 88.5–89.5°) in 70 parts of anhydrous ether is cautiously added approximately 8 parts of diazomethane dissolved in 140 parts of anhydrous ether. The resultant mixture is maintained at approximately 5° for 2½ hours, then distilled in vacuo. The fraction boiling at 142°/0.1 mm., a colorless viscous oil, is methyl 5-hydroxy-2-(p-methoxyphenyl)cyclopentaneacetate.

(B) *5-hydroxy - 2 - (p - methoxyphenyl)cyclopentaneethanol.*—To a boiling solution of 12 parts of lithium aluminum hydride in 490 parts of anhydrous ether is slowly added 13 parts of methyl 5-hydroxy-2-(p-methoxyphenyl)cyclopentaneacetate (B.P. 142°/0.1 mm.) dissolved in 70 parts of anhydrous ether. The resultant solution is maintained at the boiling point under reflux for 5 hours, then alternately diluted, during agitation, with water and aqueous 20% sodium hydroxide according to the technique of N. G. Gaylord, Reduction With Complex Metal Hydrides, page 1011 (Interscience Publishers, Inc.; New York; 1956). The colorless granular solid which precipitates is removed by filtration, and the filtrate is freed of solvent by vacuum distillation. The residue is 5-hydroxy - 2 - (p-methoxyphenyl)cyclopentaneethanol which, recrystallized from a mixture of pentane and anhydrous ether, is obtained as colorless massive rectangular plates melting at 80–82.5°.

Substitution of 10 parts of lithium aluminum hydride in 490 parts of anhydrous ether and 3 parts of 5-hydroxy-2-(p-methoxyphenyl)cyclopentaneacetic acid γ-lactone (M.P. 145–145.5°) in 8050 parts of anhydrous ether for the 12 parts of lithium aluminum hydride in 490 parts of anhydrous ether and 13 parts of methyl 5-hydroxy-2-(p-methoxyphenyl)cyclopentaneacetate called for, respectively, in the preceding paragraph affords, by the procedure there detailed, 5-hydroxy-2-(p-methoxyphenyl)cyclopentaneethanol as colorless plates melting at 105–106.5°.

Each of the two products hereof is composed of two enantiomorphs individually diastereomeric with those present in the other product. The products have the formula

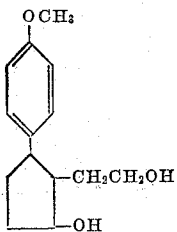

*Example 3*

*5-hydroxy-2-(p-methoxyphenyl) - α,α - dimethylcyclopentaneethanol.*—To a boiling solution of 6 parts of 5-hydroxy - 2 - (p-methoxyphenyl)cyclopentaneacetic acid γ-lactone (M.P. 145–145.5°) in 180 parts of tetrahydrofuran is slowly added a solution of 18 parts of methylmagnesium bromide in 90 parts of tetrahydrofuran. The resultant mixture is maintained at the boiling point under reflux for 3½ hours, then diluted with water and made acid with 5% hydrochloric acid. Tetrahydrofuran is removed by vacuum distillation, and the residue is extracted with ether. The ether extract is successively washed with water and saturated brine, then dried over anhydrous sodium sulfate, and finally stripped of solvent by distillation. The residual oil crystallizes from a mixture of anhydrous ether and pentane as colorless plates melting at 122–128°. The product thus obtained is 5-hydroxy - 2 - (p-methoxyphenyl)-α,α - dimethylcyclopentaneethanol. It has the formula

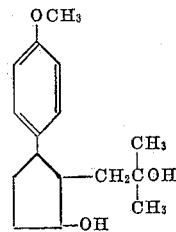

*Example 4*

(A) *m-Ethoxy-β-(2-furyl)acrylophenone.*—To a solution of 70 parts of m-ethoxyacetophenone and 45 parts of 2-furaldehyde in 65 parts of 95% ethanol is added 4 parts of aqueous 45% potassium hydroxide. The resulting mixture is maintained with agitation at 0° for 1 hour, then diluted with water. The mixture so produced is extracted with chloroform. Vacuum distillation of the chloroform extract affords a fraction boiling at 180–185° under 1 mm. pressure. This material is the desired m-ethoxy-β-(2-furyl)acrylophenone.

(B) *7-(m-ethoxyphenyl)-4,7-dioxoheptanoic acid.*—A mixture of 96 parts of m-ethoxy-β-(2-furyl)acrylophenone and 290 parts of concentrated hydrochloric acid in 800 parts of 95% ethanol is heated at the boiling point under reflux for 18 hours. Solvent is then removed by vacuum distillation; and the residue is successively mixed with 525 parts of glacial acetic acid, 600 parts of concentrated hydrochloric acid, and 1000 parts of water. The mixture thus obtained is heated at the boiling point under reflux for 2 hours. The resultant two-phase mixture is separated by decantation (hot), the subnatant black tar being discarded. From the supernatant aqueous phase, on cooling, there precipitates 7-(m-ethoxyphenyl)-4,7-dioxoheptanoic acid which, recrystallized from a mixture of ethyl acetate and cyclohexane, is obtained as needles melting at approximately 86–87°.

(C) *2-(m-ethoxyphenyl)-5-oxo - 1 - cyclopenteneacetic acid.*—A solution of 22 parts of 7-(m-ethoxyphenyl)-4,7-dioxoheptanoic acid and 20 parts of potassium hydroxide in 1000 parts of water is heated at the boiling point under reflux for 1 hour. The solution is then cooled and acidified with concentrated hydrochloric acid. The oil thus liberated granulates on standing, chilled. The granular material, recovered on a filter and recrystallized from a mixture of isopropyl ether and carbon tetrachloride, is 2-(m-ethoxyphenyl)-5-oxo-1-cyclopenteneacetic acid, obtained thus as prisms melting at approximately 97–98°.

(D) *2 - (m - ethoxyphenyl) - 5 - oxocyclopentaneacetic acid.*—A mixture of 42 parts of 2-(m-ethoxyphenyl)-5-oxo-1-cyclopenteneacetic acid, 9 parts of potassium hydroxide, 10 parts of 5% palladium-on-carbon catalyst, and 500 parts of water is maintained with agitation at room temperatures under 3 atmospheres of hydrogen for 22 hours. Catalyst is then removed by filtration, and the filtrate is made acid with dilute hydrochloric acid. The oil thus liberated solidifies on cooling. This solid material is 2-(m-ethoxyphenyl)-5-oxocyclopentaneacetic acid which, recrystallized from a mixture of carbon tetrachloride and cyclohexane, is obtained as prisms melting at 89.5–91°.

(E) *2-(m-ethoxyphenyl) - 5 - hydroxycyclopetaneacetic acid and 2(m-ethoxyphenyl)-5-hydroxycyclopentaneacetic acid γ-lactone.*—To a solution of 16 parts of 2-(m-ethoxyphenyl)-5-oxocyclopentaneacetic acid (M.P. 89.5–91°) and 3 parts of sodium hydroxide in 530 parts of water is added 8 parts of sodium borohydride dissolved in 75 parts of water. The resulting solution is maintained with agitation at room temperatures for 9 hours, then acidified with concentrated hydrochloric acid. The mixture thus obtained is agitated at room temperatures for 2 hours, following which it is extracted with ethyl acetate. The acetate extract is washed with saturated brine and then stripped of solvent by distillation. The residue is partitioned between ethyl acetate and aqueous 5% sodium bicarbonate.

The bicarbonate phase is acidified with dilute hydrochloric acid, and the resultant mixture is extracted with ethyl acetate. This extract, dried over anhydrous sodium sulfate and stripped of solvent by vacuum distillation, affords 2-(m-ethoxyphenyl)-5-hydroxycyclopentaneacetic acid as the residue which, recrystallized from a mixture of chloroform and ligroin, is obtained in the form of prisms melting at 96–97°.

The acetate phase from the foregoing partitioning, preliminarily dried over anhydrous sodium sulfate, is subjected to vacuum distillation, which serves at once to remove solvent and isolate 2-(m-ethoxyphenyl)-5-hydroxycyclo pentaneacetic acid as a γ-lactone, boiling at 150–160° (bath temperatures) under 0.1 mm. pressure.

The two 2-(m-ethoxyphenyl)-5-hydroxycyclopentaneacetic acids referred to are, in the unlactonized form, composed in each instance of two enantiomorphs individually diastereomeric with those present in the other 2-(m-ethoxyphenyl)-5-hydroxycyclopentaneacetic acid.

(F) *Methyl 2-(m-ethoxyphenyl)-5-hydroxycyclopentaneacetate.*—To a suspension of 16 parts of 2-(m-ethoxyphenyl)-5-hydroxycyclopentaneacetic acid (M.P. 96–97°) in 140 parts of anhydrous ether is added a solution of 3 parts of diazomethane in 70 parts of anhydrous ether. The mixture thus obtained is maintained with agitation at room temperatures for 45 minutes, during which time solution occurs. The solution is washed successively with aqueous 5% sodium bicarbonate and saturated brine, then freed of solvent by vacuum distillation. Further distillation in vacuo affords methyl 2-(m-ethoxyphenyl)-5-hydroxycyclopentaneacetate in the fraction boiling at 157–160° under 0.2 mm. pressure.

(G) *2-(m-ethoxyphenyl)-5-hydroxycyclopentaneethanol.*—To a solution of 6 parts of methyl 2-(m-ethoxyphenyl)-5-hydroxycyclopentaneacetate (B.P. 157–160°/0.2 mm.) in 20 parts of anhydrous ether is slowly added a solution of 1 part of lithium aluminum hydride in 20 parts of anhydrous ether. The resulting mixture is maintained with agitation for 1 hour at room temperatures, whereupon sufficient ethyl acetate to decompose excess lithium aluminum hydride is introduced, followed, after cooling to 0°, by 25 parts of 10% sulfuric acid. The mixture thus obtained is extracted with ether, and the ether extract is stripped of solvent in vacuo. The residue is 2-(m - ethoxyphenyl) - 5 - hydroxycyclopentaneethanol which, crystallized from cyclohexane, is obtained as needles melting at approximately 88.5–89.5°.

Substitution of 6 parts of the 2-(m-ethoxyphenyl)-5-hydroxycyclopentaneacetic acid γ-lactone obtainable by the procedure of the foregoing Part E of this example for the 6 parts of methyl 2-(m-ethoxyphenyl)-5-hydroxycyclopentaneacetate called for in the preceding paragraph affords, by the procedure there detailed, 2-(m-ethoxyphenyl)-5-hydroxycyclopentaneethanol melting at 100–101.5°, a mixture of benzene and ligroin rather than cyclohexane being used as the crystallization solvent.

Each of the two products hereof is composed of two enantiomorphs individually diastereomeric with those present in the other product. The products have the formula

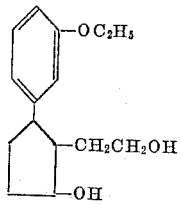

Example 5

(A) *5 - hydroxy - 2 - (p - methoxyphenyl) - 5 - methylcyclopentaneacetic acid and 5-hydroxy-2-(p-methoxyphenyl)-5-methylcyclopentaneacetic acid γ-lactone.*—To a solution of 40 parts of 2-(p-methoxyphenyl)-5-oxocyclopentane acetic acid (M.P. 110–112.5°) in 1400 parts of anhydrous ether is slowly added, with agitation, approximately 43 parts of methylmagnesium bromide dissolved in 350 parts of anhydrous ether. The resultant mixture is maintained with agitation at room temperatures for 2½ hours, then diluted with sufficient water to induce solution, followed by 5% hydrochloric acid to the point of marked acidity. The ethereal layer is separated, washed successively with 5% hydrochloric acid and water, and stripped of solvent by distillation. The residue is partitioned between ether and aqueous 5% sodium bicarbonate.

The bicarbonate phase is acidified with hydrochloric acid, and the resultant mixture is extracted with ether. The ether extract, washed first with water and then with brine, is next dried over anhydrous sodium sulfate and finally stripped of solvent by vacuum distillation. The residue is chromatographed on silica gel, using benzene and ethyl acetate as developing solvents. From eluates comprising 20% ethyl acetate in benzene, on evaporation of solvent and recrystallization of the residue from a mixture of anhydrous ether and pentane, 5-hydroxy-2-(p-methoxyphenyl)-5-methylcyclopentaneacetic acid is obtained as colorless densely-packed platelets melting at approximately 131.5–132.5°.

The ethereal phase from the foregoing partitioning, consecutively washed with water and saturated brine, dried over anhydrous sodium sulfate, and freed of solvent by bacuum distillation, affords 5-hydroxy-2-(p-methoxyphenyl)-5-methylcyclopentaneacetic acid in the form of the γ-lactone as an oil which precipitates from a mixture of anhydrous ether and pentane as colorless dense massive crystals melting at 61–62.5°.

The two 5-hydroxy-2-(p-methoxyphenyl)-5-methylcyclopentaneacetic acids referred to are, in the unlactonized form, composed in each instance of two enantiomorphs individually diastereomeric with those present in the other 5-hydroxy-2-(p-methoxyphenyl)-5-methylcyclopentaneacetic acid.

(B) *Methyl 5-hydroxy-2-(p-methoxyphenyl)-5-methylcyclopentaneacetate.*—To a chilled solution of 32 parts of 5 - hydroxy - 2 - (p - methoxyphenyl) - 5 - methylcyclopentaneacetic acid (M.P. 131.5–132.5°) in 630 parts of anhydrous ether is added a solution of 4 parts of diazomethane in 350 parts of anhydrous ether. The resultant mixture is allowed to stand at 0–5° for 2 hours, then freed of solventb y distillation. The viscous pale-yellow oil which remains as the residue is methyl 5-hydroxy-2-(p-methoxyphenyl)-5-methylcyclopentaneacetate.

(C) *5-hydroxy-2-(p-methoxyphenyl)-5-methylcyclopentaneethanol.*—To a boiling solution of 10 parts of lithium aluminum hydride in 280 parts of anhydrous ether is slowly added 7 parts of 5-hydroxy-2-(p-methoxyphenyl)-5-methylcyclopentaneacetic acid γ-lactone (M.P. 61–62.5°) dissolved in 70 parts of anhydrous ether. The resultant solution is maintained at the boiling point under reflux for 3 hours, then alternately diluted, during agitation, with water and aqueous 20% sodium hydroxide according to the technique of N. G. Gaylord, op. cit. The colorless granular solid which precipitates is removed by filtration, and the filtrate is freed of solvent by vacuum distillation. The residue is 5-hydroxy-2-(p-methoxyphenyl)-5-methyl-cyclopentaneethanol which, recrystalized from a mixture of pentane and anhydrous ether, is obtained as colorless needles melting at approximately 100–100.5°.

Substitution of 50 parts of lithium aluminum hydride in 1400 parts of anhydrous ether and 32 parts of the methyl 5 - hydroxy - 2 - (p - methtoxyphenyl) - 5 - methylcyclopentaneacetate obtained by the procedure of the foregoing Part B of this example in 350 parts of anhydrous ether for the 10 parts of lithium aluminum hydride in 280 parts of anhydrous ether and 7 parts of 5-hydroxy-2-(p-methoxyphenyl)-5-methylcyclopentaneacetic acid γ-lactone in 70 parts of anhydrous ether called for, respectively in the preceding paragraph affords, by the procedure there detailed, 5 - hydroxy - 2 - (p - methovxyphenyl) - 5 - methyl-cyclopentaneethanol as colorless platelets melting at approximately 132.5–133.5°.

Each of the two products hereof is composed of two enantiomorphs individually diastereomeric with those present in the other product. The products have the formula

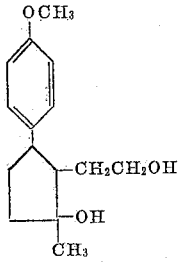

*Example 6*

(A) *5 - ethyl - 5-hydroxy-2-(p-methoxyphenyl)-cyclopentaneacetic acid and 5-ethyl-5-hydroxy-2-(p-methoxyphenyl)cyclopentaneacetic acid γ-lactone.*—Substitution of 67 parts of ethylmagnesium bromide for the 43 parts of methylmagnesium bromide called for in Example 5A affords, by the procedure there detailed, 5-ethyl-5-hydroxy-2-(p-methoxyphenyl)cyclopentaneacetic acid and 5-ethyl-5 - hydroxy - 2-(p-methoxyphenyl)cyclopentaneacetic acid γ-lactone as viscous oils, the lactone (isolated from the ethereal phase following partitioning) being yellow in color, the unlactonized product (isolated from the bicarbonate phase) chromatically nondescript, and both products being resistant to crystallization.

(B) *Methyl 5 - ethyl-5-hydroxy-2-(p-methoxyphenyl)-cyclopentaneacetate.*—Substitution of 36 parts of the 5-ethyl - 5-hydroxy-2-(p-methoxyphenyl)cyclopentaneacetic acid obtainable as described in the foregoing Part A of this example for the 32 parts of 5-hydroxy-2-(p-methoxyphenyl)-5-methylcyclopentaneacetic acid called for in Example 5B affords, by the procedure there detailed, methyl 5-ethyl-5-hydroxy-2-(p-methoxyphenyl)cyclopentaneacetate as a viscous yellow-orange oil.

(C) *5 - ethyl-5-hydroxy-2-(p-methoxyphenyl)cyclopentaneethanol.*—To a boiling solution of 10 parts of lithium aluminum hydride in 700 parts of anhydrous ether is slowly added 12 parts of the 5-ethyl-5-hydroxy-2-(p-methoxyphenyl)cyclopentaneacetic acid γ-lactone obtainable as described in Part A of this example dissolved in 350 parts of anhydrous ether. The resultant solution is maintained at the boiling point under reflux for 16 hours, then alternately diluted, during agitation, with water and aqueous 20% sodium hydroxide according to the technique of N.G. Gaylord, op. cit. The colorless granular solid which precipitates is removed by filtration, and the filtrate is freed of solvent by vacuum distillation. The residual pale-yellow -viscous oil is 5-ethyl-5-hydroxy-2-(p-methoxyphenyl)cyclopentaneethanol which, crystallized from a mixture of pentane and anhydrous ether, melts at approximately 92.5–93°.

Substitution of 9 parts of the methyl 5-ethyl-5-hydroxy-2-(p-methoxyphenyl)cyclopentaneacetate obtainable as described in the foregoing Part B of this example for the 12 parts of 5-ethyl-5-hydroxy-2-(p-methoxyphenyl)cyclopentaneacetic acid γ-lactone called for in the preceding paragraph affords, by the procedure there detailed, 5-ethyl-5 - hydroxy-2-(p-methoxyphenyl)cyclopentaneethanol as colorless massive dense crystals melting at 53–59°.

Each of the two products hereof is composed of two enantiomorphs individually diastereomeric with those present in the other product. The products have the formula

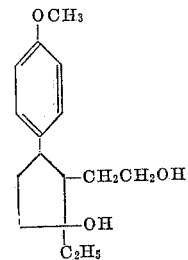

*Example 7*

(A) *5 - ethynyl-5-hydroxy-2-(p-methoxyphenyl)cyclopentaneacetic acid and 5-ethynyl-5-hydroxy-2-(p-methoxyphenyl) cyclopentaneacetic acid γ-lactone.*—To 270 parts of tetrahydrofuran, saturated with acetylene and through which acetylene is continuously passed during the ensuing 7 hours, a solution of approximately 40 parts of ethylmagnesium bromide in 180 parts of tetrahydrofuran is added, with agitation, during 2½ hours. The resultant mixture is diluted with 90 parts of tetrahydrofuran and cooled at 0–5° for 1 hour, whereupon 10 parts of 2-(p-methoxyphenyl)-5-oxocyclopentaneacetic acid (M.P. 110–112.5°) dissolved in 90 parts of tetrahydrofuran is introduced during 1½ hours, agitation at 0–5° temperatures being maintained throughout. A further 45 parts of tetrahydrofuran is introduced and agitation at 0–5° is continued for 2 more hours, at which point passage of acetylene is discontinued; and the reactants are allowed to warm to room temperatures, with agitation, over 18 hours. The dark reaction mixture thus obtained is concentrated by vacuum distillation at 90–100° until a solid precipitate appears, whereupon the concentrate is chilled and cautiously diluted with approximately 235 parts of 20% sulfuric acid. The resultant mixture is extracted with ether. The ether extract is washed with water and stripped of solvent by distillation. The residue is partitioned between ether and aqueous sodium bicarbonate.

The bicarbonate phase is acidified with ice-and-hydrochloric acid, and the resulting mixture is extracted with ether. The ether extract, consecutively washed with water and saturated brine, then dried over anhydrous sodium sulfate, and finally freed of solvent by vacuum distillation, affords 5 - ethynyl - 5-hydroxy-2-(p-methoxyphenyl)cyclopentaneacetic acid as a dark-brown viscous oil which is further purified by chromatography on silica gel, using benzene and ethyl acetate as developing solvents. From eluates comprising 10–20% ethyl acetate in benzene, upon evaporation of solvent, the product is obtained as an oil which resists crystallization.

The ethereal phase from the foregoing partitioning, consecutively washed with water and saturated brine, dried over anhydrous sodium sulfate, and finally freed of solvent by vacuum distillation, affords 5-ethynyl-5-hydroxy-2-(p-methoxyphenyl)cyclopentaneacetic acid in the form of the γ-lactone as a dark brown oil which is further purified by chromatography on silica gel, using benzene and ethyl acetate as developing solvents. From eluates comprising 5–10% ethyl acetate in benzene, upon stripping of solvent and crystallization of the residue from a mixture of anhydrous ether and pentane, the lactone is obtained as a colorless dense solid melting at approximately 73–74°.

The two 5-ethynyl-5-hydroxy-2-(p-methoxyphenyl)-cyclopentaneacetic acids referred to are, in the unlactonized form, composed in each instance of two enantiomorphs individually diastereomeric with those present in the other 5-ethynyl-5-hydroxy-2-(p-methoxyphenyl)cyclopentaneacetic acid.

(B) *Methyl 5-ethynyl-5-hydroxy-2-(p-methoxyphenyl)-cyclopentaneacetate.*—Substitution of 44 parts of the 5 - ethynyl - 5 - hydroxy - 2 - (p - methoxyphenyl)cyclopentaneacetic acid obtainable as described in the foregoing Part A of this example dissolved in 700 parts of anhydrous ether, and 7 parts of diazomethane dissolved in 560 parts of anhydrous ether, for the 32 parts of 5-hydroxy - 2 - (p - methoxyphenyl) - 5 - methylcyclopentaneacetic acid in 630 parts of anhydrous ether, and 4 parts of diazomethane in 350 parts of anhydrous ether, respectively, called for in Example 5B affords, by the procedure there detailed, methyl 5-ethynyl-5-hydroxy-2-(p-methoxyphenyl)cyclopentaneacetic as a viscous yellow oil.

(C) *Methyl 5-acetoxy-5-ethynyl-2-(p-methoxyphenyl)-cyclopentaneacetate.*—Approximately 1 part of the methyl 5 - ethynyl - 5 - hydroxy - 2 - (p - methoxyphenyl)cyclopentaneacetate obtainable as described in the foregoing Part B of this example dissolved in 10 parts of acetic anhydride and 10 parts of pyridine is maintained at 65° for 96 hours. The solution is then poured into a mixture of ice and water, precipitating an oil, which solidifies upon vigorous agitation. This material is methyl 5-acetoxy-5-ethynyl-2-(p-methoxyphenyl)cyclopentaneacetate which, recovered on a filter and recrystallized from a mixture of anhydrous ether and pentane, is obtained as colorless rhomboids melting at 127.5–130°.

(D) *5-ethynyl-5-hydroxy-2-(p-methoxyphenyl)-cyclopentaneethanol.*—To a boiling solution of 8 parts of lithium aluminum hydride in 700 parts of anhydrous ether is slowly added 5 parts of the methyl 5-acetoxy-5-ethynyl-2-(p-methoxyphenyl)cyclopentaneacetate obtainable as described in the foregoing Part C of this example dissolved in 350 parts of anhydrous ether. The resultant solution is maintained at the boiling point under reflux for 1¼ hours, then alternately diluted, during agitation, with water and aqueous 20% sodium hydroxide according to the technique of N. G. Gaylord, op. cit. The colorless granular solid which precipitates is removed by filtration, and the filtrate is freed of solvent by vacuum distillation. The viscous yellow oil which remains as the residue is 5-ethynyl-5-hydroxy-2-(p-methoxyphenyl)-cyclopentaneethanol which, crystallized from a mixture of pentane and anhydrous ether, is obtained as colorless plates melting at 103–105°.

A mixture of 1 part of the 5-ethynyl-5-hydroxy-2-(p-methoxyphenyl)cyclopentaneacetic acid γ-lactone obtainable as described in Part A of this example, 1 part of sodium borohydride, and 16 parts of 2-propanol is maintained with agitation at room temperatures for 15 hours, then diluted with a large volume of water and made acid with 5% hydrochloric acid. The 2-propanol is removed by vacuum distillation, and the residue is extracted with ether. The ether extract is consecutively washed with water, aqueous 5% sodium bicarbonate, water again, and saturated brine; then dried over anhydrous sodium sulfate; and finally stripped of solvent by distillation. The residue, a pale yellow oil, is chromatographed on silica gel, using benzene and ethyl acetate as developing solvents. From eluates comprising 20% ethyl acetate in benzene, on evaporation of solvent and recrystallization of the residue from a mixture of anhydrous ether and pentane, 5-ethynyl-5-hydroxy-2-(p-methoxyphenyl)cyclopentaneethanol is obtained as long stout colorless needles and rods melting at approximately 87.5–88.5°.

Each of the two products hereof is composed of two enantiomorphs individually diastereomeric with those present in the other product. The products have the formula

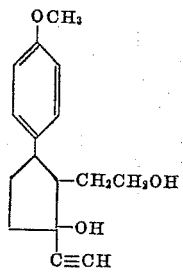

*Example 8*

(A) *5-hydroxy-2-(p-methoxyphenyl)-5-vinylcyclopentaneacetic acid γ-lactone.*—A mixture of 5 parts of 5-ethynyl - 5 - hydroxy - 2 - (p - methoxyphenyl)cyclopentaneacetic acid γ-lactone (M.P. 73–74°), 34 parts of pyridine, 3 parts of palladium-on-calcium carbonate catalyst, and 245 parts of 95% ethanol is maintained with agitation at room temperatures under approximately 1 atmosphere of hydrogen until hydrogen uptake indicates that conversion of the ethynyl grouping present to a vinyl radical is complete. Catalyst is then removed by filtration, and the filtrate is freed of solvent by distillation. The residue is taken up in ether. The ether solution is washed successively with 5% hydrochloric acid, water, and saturated brine; then dried over anhydrous sodium sulfate; and finally stripped of solvent by vacuum distillation. The yellow-brown viscous oil which remains as the residue is 5-hydroxy - 2 - (p - methoxyphenyl)-5-vinylcyclopentaneacetic acid γ-lactone.

(B) *5-hydroxy-2-(p-methoxyphenyl)-5-vinylcyclopentaneethanol.*—To a boiling solution of 1 part of lithium aluminum hydride in 70 parts of anhydrous ether is slowly added a solution of approximately 1 part of the 5-hydroxy - 2-(p-methoxyphenyl)-5-vinylcyclopentaneactic acid γ-lactone obtainable as described in the foregoing Part A of this example dissolved in 35 parts of anhydrous ether. The resultant solution is maintained at the boiling point under reflux for 2¼ hours, then alternately diluted, during agitation, with water and aqueous 20% sodium hydroxide according to the technique of N. G. Gaylord, op. cit. The colorless granular solid which precipitates is removed by filtration, and the filtrate is freed of solvent by vacuum distillation. The residual pale-yellow viscous oil is 5-hydroxy-2-(p-methoxyphenyl)-5-vinylcyclopentaneethanol which, upon crystallization from a mixture of pentane and anhydrous ether, is obtained as dense crystals melting at approximately 91–92°.

Substitution of 4 parts of 5-ethnyl-5-hydroxy-2-(p-methoxyphenyl)cyclopentaneethanol (M.P. 103–105°) for the 5 parts of 5-ethnyl-5-hydroxy-2-(p-methoxyphenyl)-cyclopentaneacetic acid γ-lactone called for in the foregoing Part A of this example affords, by the procedure there detailed, 5-hydroxy-2-(p-methoxyphenyl)-5-vinyl-cyclopentaneethanol as an oil.

Each of the two products hereof is composed of two enantiomorphs individually diastereomeric with those present in the other product. The products have the formula

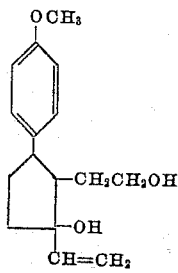

What is claimed is:
1. A compound of the formula

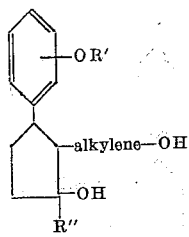

wherein
(a) R' represents a member of the group consisting of
—H
and
—lower alkyl
(b) R" represents a member of the group consisting of
—H
—lower alkyl
—CH=CH$_2$
and
—C≡CH
(c) the alkylene radical represented contains more than 1 and fewer than 5 carbon atoms.

2. A compound of the formula

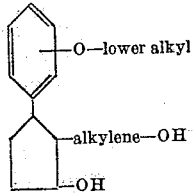

wherein the alkylene radical represented contains more than 1 and fewer than 5 carbon atoms.

3. A compound of the formula

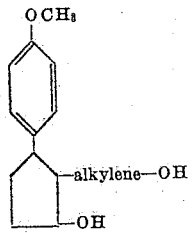

wherein the alkylene radical represented contains more than 1 and fewer than 5 carbon atoms.

4. A compound of the formula

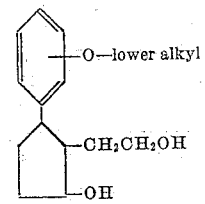

5. A compound of the formula

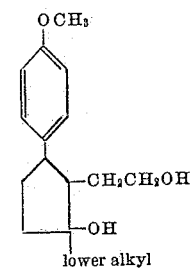

6. 5 - hydroxy-2-(p-hydroxyphenyl)-cyclopentaneethanol.
7. 5 - hydroxy-2-(p-methoxyphenyl)cyclopentaneethanol.
8. 2 - (m-ethoxyphenyl)-5-hydroxycyclopentaneethanol.
9. 5 - hydroxy-2-(p-methoxyphenyl)-α,α-dimethylcyclopentaneethanol.
10. 5 - hydroxy-2-(p-methoxyphenyl)-5-methylcyclopentaneethanol.
11. 5 - ethynyl-5-hydroxy-2-(p-methoxyphenyl)cyclopentaneacetic acid γ-lactone.
12. Methyl 5-acetoxy-5-ethynyl-2-(p-methoxyphenyl)-cyclopentaneacetate.

References Cited in the file of this patent
Grienko et al.: Chem. Abstracts, vol. 51, page 14769 (1957).